United States Patent
Kaushik et al.

(10) Patent No.: US 10,423,584 B2
(45) Date of Patent: Sep. 24, 2019

(54) SYNCHRONOUS REPLICATION FOR FILE ACCESS PROTOCOL STORAGE

(71) Applicant: NetApp Inc., Sunnyvale, CA (US)

(72) Inventors: Akhil Kaushik, San Jose, CA (US); Yi Yang, San Jose, CA (US); Yuedong Mu, San Jose, CA (US)

(73) Assignee: NetApp Inc., Sunnyvale, CA (US)

( * ) Notice: Subject to any disclaimer, the term of this patent is extended or adjusted under 35 U.S.C. 154(b) by 587 days.

(21) Appl. No.: 14/948,653

(22) Filed: Nov. 23, 2015

(65) Prior Publication Data

US 2017/0147601 A1 May 25, 2017

(51) Int. Cl.
G06F 16/178 (2019.01)
G06F 16/16 (2019.01)
H04L 29/08 (2006.01)
G06F 3/06 (2006.01)
G06F 11/20 (2006.01)

(52) U.S. Cl.
CPC ............ *G06F 16/178* (2019.01); *G06F 3/061* (2013.01); *G06F 3/065* (2013.01); *G06F 3/067* (2013.01); *G06F 3/0619* (2013.01); *G06F 11/2064* (2013.01); *G06F 16/16* (2019.01); *H04L 67/1095* (2013.01); *H04L 67/1097* (2013.01)

(58) Field of Classification Search
CPC ......... G06F 17/30575; G06F 17/30156; G06F 11/1464; G06F 11/2082; G06F 16/16; G06F 16/178
USPC ........................ 707/E17.032, 610, 999.2, 623
See application file for complete search history.

(56) References Cited

U.S. PATENT DOCUMENTS

| 7,617,259 | B1 | 11/2009 | Muth et al. |
| 2005/0138252 | A1* | 6/2005 | Gwilt ..................... G06F 13/36 710/110 |
| 2010/0100529 | A1* | 4/2010 | Erofeev ............. G06F 11/1456 707/610 |
| 2014/0298078 | A1 | 10/2014 | Keremane et al. |

OTHER PUBLICATIONS

Int. Search Report/Written Opinion cited in PCT Application No. PCT/US2016/063283 dated Mar. 2, 2017, 13 pgs.

* cited by examiner

*Primary Examiner* — Robert W Beausoliel, Jr.
*Assistant Examiner* — Pedro J Santos
(74) *Attorney, Agent, or Firm* — Cooper Legal Group, LLC

(57) ABSTRACT

One or more techniques and/or computing devices are provided for implementing synchronous replication. For example, a synchronous replication relationship may be established between a local storage controller hosting local storage and a remote storage controller hosting remote storage (e.g., replication may be specified at a file, logical unit number (LUN), or any other level of granularity). Data file operations may be implemented in parallel upon the local storage and the remote storage. Independent metadata file operations may be independently implemented from data file operations upon the local storage, and upon local completion may be remotely implemented upon the remote storage. In-flight data file operations may be drained before dependent metadata file operations are locally implemented upon the local storage, and upon local completion may be remotely implemented upon the remote storage.

20 Claims, 20 Drawing Sheets

SYNCHRONOUS REPLICATION FOR FILE ACCESS PROTOCOL STORAGE

BACKGROUND

A storage environment may provide clients with access to data using file access protocols, such as a network file system protocol, a common internet file system protocol, virtualized network attached storage, etc. In an example, the storage environment may comprise one or more storage controllers configured to provide clients with access to data within storage devices owned by such storage controllers. For example, a first storage controller may provide clients with access to data within a first storage device. A second storage controller may provide clients with access to data within a second storage device.

A synchronous replication relationship may be established between the first storage controller and the second storage controller, which may improve data loss protection and mitigate client interruptions of service in the event a storage controller and/or storage device fails or becomes unavailable. For example, data may be replicated from the first storage device to the second storage device (e.g., replicated to a storage device accessible to the second storage controller but initially owned by the first storage controller) so that the second storage controller may provide clients with failover access to replicated data within the second storage device in the event the first storage controller fails. In an example of synchronous replication, a write request, targeting the first storage device, may be split into a local write request that is to be performed upon the first storage device and a remote write request that it to be performed upon the second storage device (e.g., the local write request may be performed first upon the first storage device, and upon completion of the local write request, the remote write request may be performed upon the second storage device). Once both the local write request and the remote write request are complete, a write request complete notification may be provided back to a client that issued the write request. Unfortunately, synchronous replication may be implemented within a file system, and thus changes to the file system may render the synchronous replication inoperable. Additionally, synchronous replication may be merely available at a coarse level of granularity, such as a volume level or storage controller level, and thus resources that may otherwise be used for storage operations and client data access may be undesirably consumed by overhead associated with coarse grain synchronous replication (e.g., a volume may comprise some files that a client wants replicated and other files for which the client is not interested in replication, but volume level replication may replicate all files of the volume).

DETAILED DESCRIPTION

Figure 1:
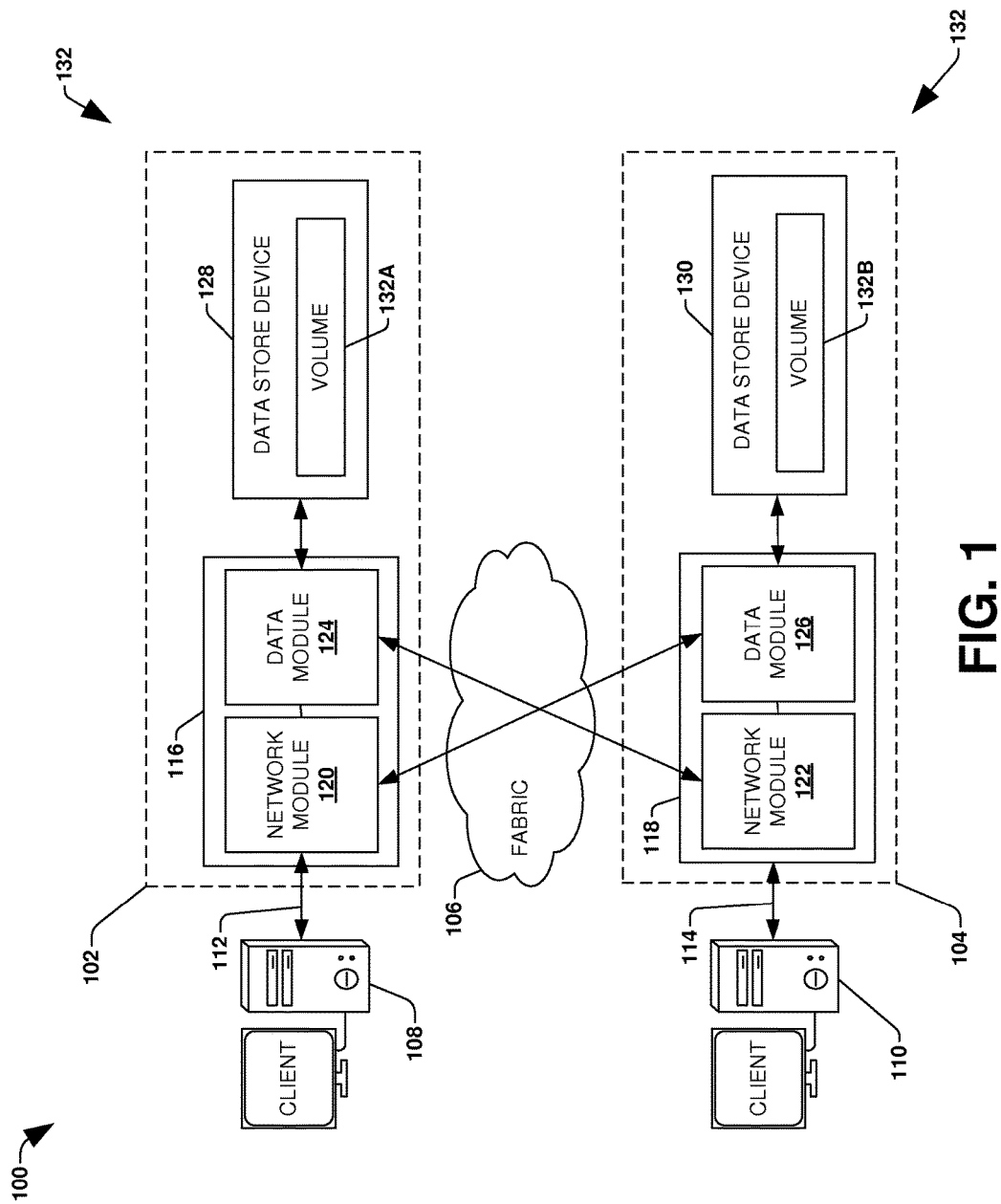
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for synchronous replication are provided. Synchronous replication may be provided for storage accessible through file access protocols, such as a network file system (NFS) protocol, a common internet file system (CIFS) protocol, virtualized network attached storage (NAS), etc. The synchronous replication may be provided above a file system such that file operations may be intercepted before reaching the file system, and thus synchronous replication may be unaffected by changes to the file system (e.g., a file system upgrade, a change from a first file system to a second file system, etc.) and/or may be file system agnostic (e.g., synchronous replication functionality may be compatible with various types of file systems).

The synchronous replication may be provided at a relatively finer level of granularity, such as for a single file, logical unit number (LUN), or a consistency group of files or LUNs, which may reduce processing resources and network bandwidth otherwise wasted on relatively coarser grain synchronization that synchronizes more files, LUNs, or data than desired (e.g., a volume level synchronization may replicate all files of a volume regardless of whether the volume comprises some files for which replication is not needed). Synchronous replication may implement data file operations in parallel, implement independent metadata file operations independent of data file operations (e.g., an independent metadata file operation is locally implemented, and then remotely implemented before responding back to a client), and drain in-flight data file operations before implementing dependent metadata file operations that are dependent upon such data file operations.

To provide context for synchronous replication, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that implementing synchronous replication may be implemented within the clustered network environment 100. In an example, a synchronous replication relationship may be established between the node 116 (e.g., a first storage controller) and the node 118 (e.g., a second storage controller). In this way, data file operations and metadata file operations may be synchronized between the data storage device 128 of node 116 and the data storage device 130 of node 118 (e.g., synchronization at a file or LUN level of granularity). It may be appreciated that synchronous replication may be implemented for and/or between any type of computing environment, and may be transferrable between physical devices (e.g., node 116, node 118, etc.) and/or a cloud computing environment (e.g., remote to the clustered network environment 100).

Figure 2:
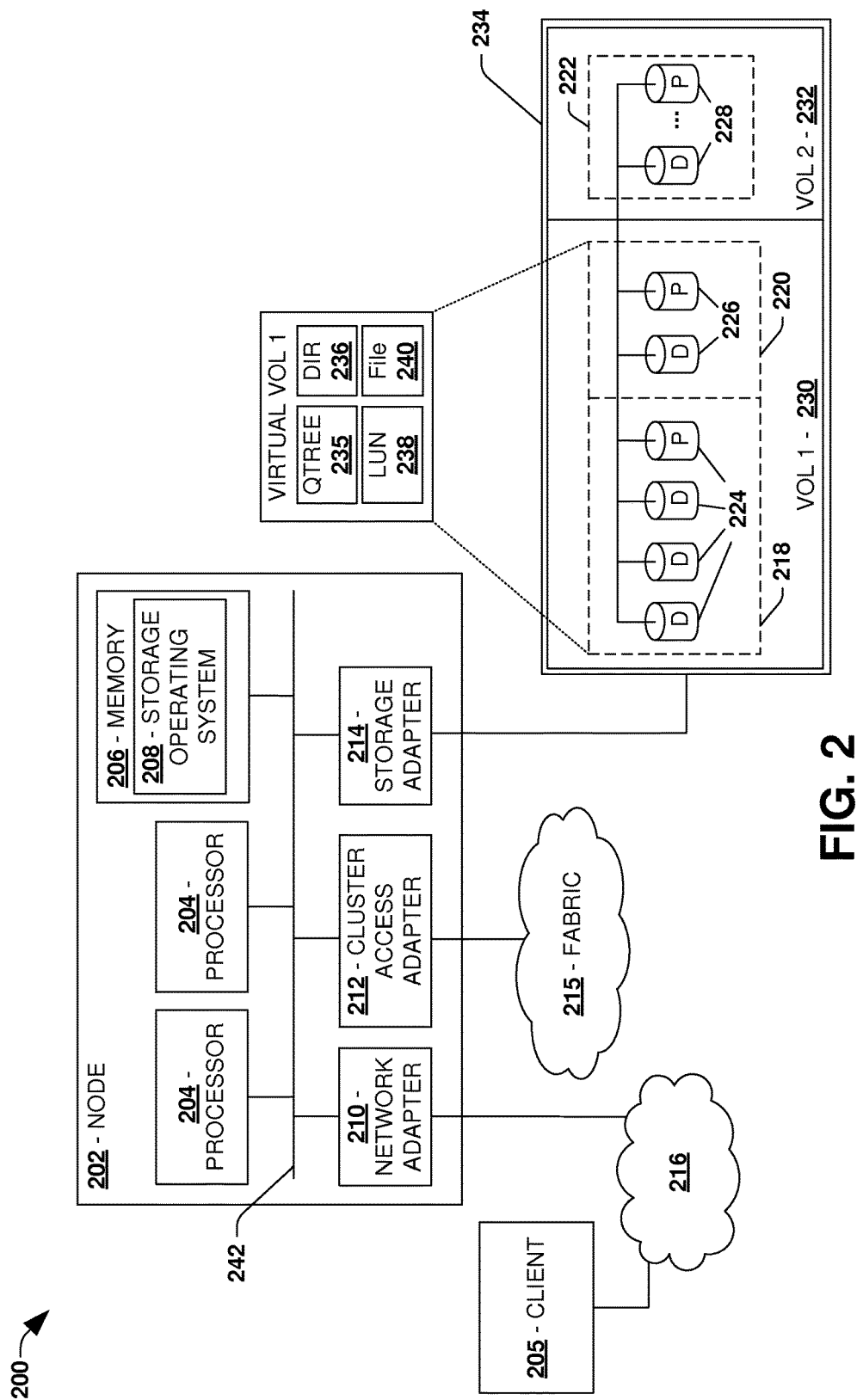
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220,

222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that implementing synchronous replication may be implemented for the data storage system 200. In an example, a synchronous replication relationship may be established between the node 202 (e.g., a first storage controller) and another node (e.g., a second storage controller). In this way, data file operations and metadata file operations may be synchronized between the node 202 and the other node (e.g., synchronization at a file or LUN level of granularity). It may be appreciated that synchronous replication may be implemented for and/or between any type of computing environment, and may be transferrable between physical devices (e.g., node 202, host 205, etc.) and/or a cloud computing environment (e.g., remote to the node 202 and/or the host 205).

Figure 3:
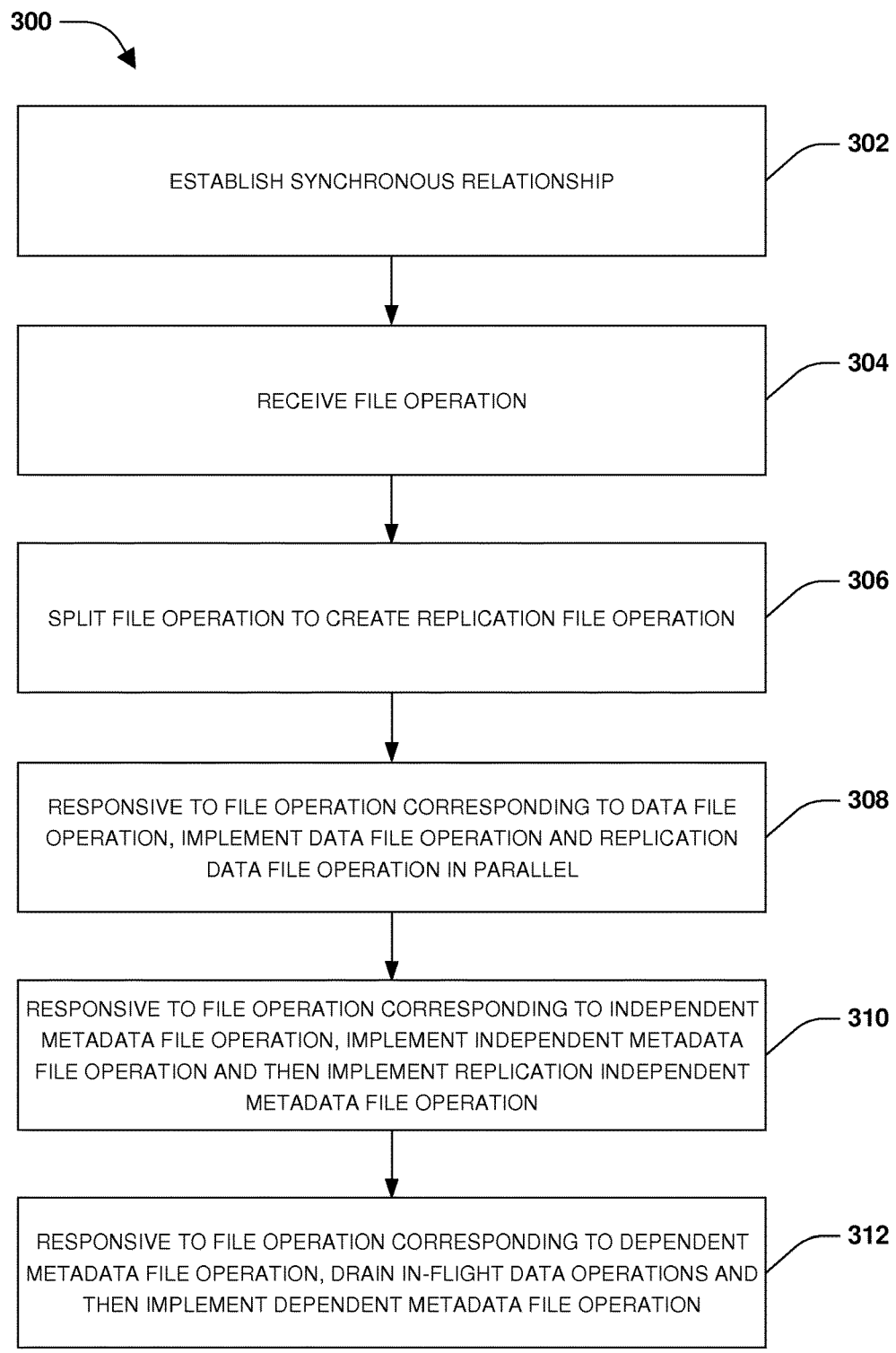
FIG. 3 is a flow chart illustrating an exemplary method of synchronous replication.

One embodiment of synchronous replication is illustrated by an exemplary method 300 of FIG. 3. At 302, a synchronous replication relationship may be established between a local storage controller hosting local storage and a remote storage controller hosting remote storage. In an example, the local storage controller (e.g., hosted within a local network cluster) and the remote storage controller (e.g., hosted within a remote network cluster) may be configured according to a disaster recovery relationship, such that a surviving storage controller may provide clients with failover access to replicated data associated with a failed storage controller (e.g., a switchover operation may be performed by the surviving storage controller in order to obtain ownership of storage comprising replicated data). The synchronous replication relationship may specify that file operations directed to the local storage controller, such as a data file operation (e.g., a write operation) or a metadata file operation (e.g., a set attribute for LUN operation, a change ownership operation, a change permissions operation, a create operation, an unlink operation, a resize operation, or other operations that change file system metadata), for commitment to the local storage is to be synchronously replicated to the remote storage controller, such as for commitment to the remote storage (e.g., commitment to both the local storage and the remote storage for synchronization before a file operation complete notification is provided back to a host that issued the file operation).

At 304, a file operation for the local storage may be received. The file operation may correspond to a file access protocol (e.g., NFS, CIFS, virtualized NAS, etc.). In an example, the file operation may be intercepted before the file operation is delivered to a file system (e.g., a network module may receive a host request, comprising the file operation, from a host, and an interceptor may intercept the file operation being passed from the network module to a data module for implementation). A configuration cache may be evaluated to determine whether a target object of the file operation is set for synchronous replication (e.g., the interceptor may query the configuration cache to determine whether a file, being written to by the file operation, is set for synchronous replication because synchronous replication may be set at a file level granularity or any other level of granularity). At 306, the file operation may be split to create a replication file operation for the remote storage. For example, a splitter may split the file operation responsive to the interceptor determining that the target object is set for synchronous replication.

At 308, responsive to the file operation corresponding to a data file operation and the replication file operation corresponding to a replication data file operation (e.g., the file operation is a data file operation such as a write operation), the data file operation may be locally implemented upon the local storage in parallel with the replication data file operation being remotely implemented upon the remote storage. Because a relatively larger number of data file operations may be received and processed, data file operations may be implemented in parallel (e.g., passed to the local storage controller for local commitment to the local storage and sent to the remote storage controller for remote commitment regardless of whether the local commit has finished), which may improve client response time because the replication data file operation may be sent to the remote storage controller for commitment to the remote storage without first waiting for an acknowledgement that the data file operation was successfully committed by the local storage controller to the local storage.

At 310, responsive to the file operation corresponding to an independent metadata file operation that is independent from data file operations (e.g., independent from in-flight data file operations that are identified from an in-flight tracking log) and the replication file operation corresponding to a replication independent metadata file operation, the independent metadata file operation may be implemented upon the local storage. In an example, the independent metadata file operation may be sequenced in parallel with data file operations because the independent metadata file operation is not dependent on the data file operations (e.g., a change in ownership or access permissions may not be dependent on in-flight data file operations). Responsive to receiving a completion notification for the independent metadata file operation, the replication independent metadata file operation may be implemented upon the remote storage (e.g., the replication independent metadata file operation may be refrained from being sent to the remote storage controller until the completion notification is received).

Responsive to receiving the completion notification for the independent metadata file operation and a remote completion notification for the replication independent metadata file operation, a file operation complete notification may be sent to a host that submitted the file operation. In this way, synchronous replication may be implemented for metadata file operations that are independent of data file operations, such that the host is notified of a successfully completion of a metadata file operation once the metadata file operation has been successfully completed by both the local storage controller and the remote storage control and thus the first storage and the second storage are in a synchronous state.

At 312, responsive to the file operation corresponding to a dependent metadata file operation that is dependent upon data file operations (e.g., in-flight data file operations) and the replication file operation corresponding to a replication dependent metadata file operation, the dependent metadata file operation may be queued. For example, the dependent metadata file operation may comprise a file resize operation of a file from a first size to a second size. The file resize operation may be interdependent with respect to a pending write operation to an offset between the first size and the second size, which may otherwise result in a discrepancy over a file size of the file between the local storage and the remote storage (e.g., the file resize operation may be overridden by the pending write operation). In this way, dependent metadata file operations, dependent upon undrained in-flight data file operations, may be queued within a queue. Accordingly, in-flight data file operations may be drained (e.g., completed) before the dependent metadata file operation is performed. Responsive to the in-flight data file operations being drained, the dependent metadata file operation and/or other queued dependent metadata file operations may be de-queued for implementation upon the local storage (e.g., and synchronous replication to the remote storage).

In this way, the dependent metadata file operation may be implemented upon the local storage. Responsive to receiving a completion notification for the dependent metadata file operation, the replication dependent metadata file operation may be implemented upon the remote storage. While de-queued dependent metadata file operations are being implemented, incoming data file operations are queued for subsequent implementation after the de-queued dependent metadata file operations are completed and/or synchronously replicated to the remote storage. Responsive to receiving the completion notification for the dependent metadata file operation and a remote completion notification for the replication dependent metadata file operation, a file operation complete notification may be sent to the host that submitted the file operation.

In an example, metadata file operations may be serially implemented with respect to one another. For example, a first metadata file operation and a second metadata file operation may be received. The second metadata file may be serially implemented with respect to the first metadata file operation. In this way, data consistency may be maintained between the local storage and the remote storage for metadata file operations that arrive at the same or similar time.

In an example, the file operation may correspond to a single unified internet file access protocol (e.g., a SPINNP fileop may be received using an over-the-wire protocol). For example, the single unified internet file access protocol may correspond to a session layer over a TCP/IP and having protocols for replication between the local storage and the remote storage. Accordingly, the file operation may be tunneled (e.g., the payload of an actual client operation may be tunneled) into a single replication interface (e.g., a single wrapper for various client operations) for implementation. In this way, different types of file operations may be mapped into a single wrapper for implementation, as opposed to having individual one-to-one mappings for different file operation types, which may improve efficiency.

Figure 4A:
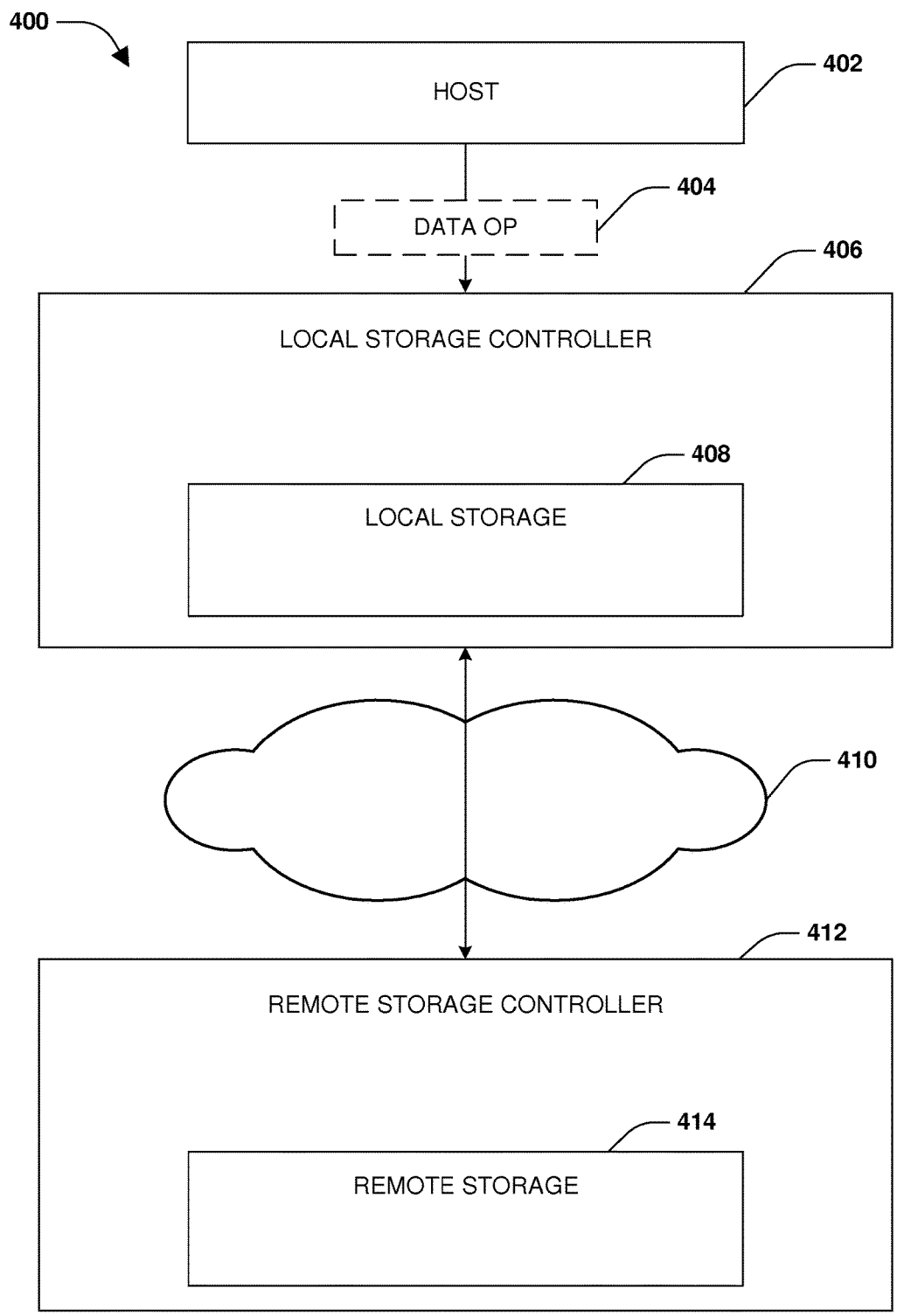
FIG. 4A is a component block diagram illustrating an exemplary computing device for synchronous replication, where a data file operation is received.
Figure 4B:
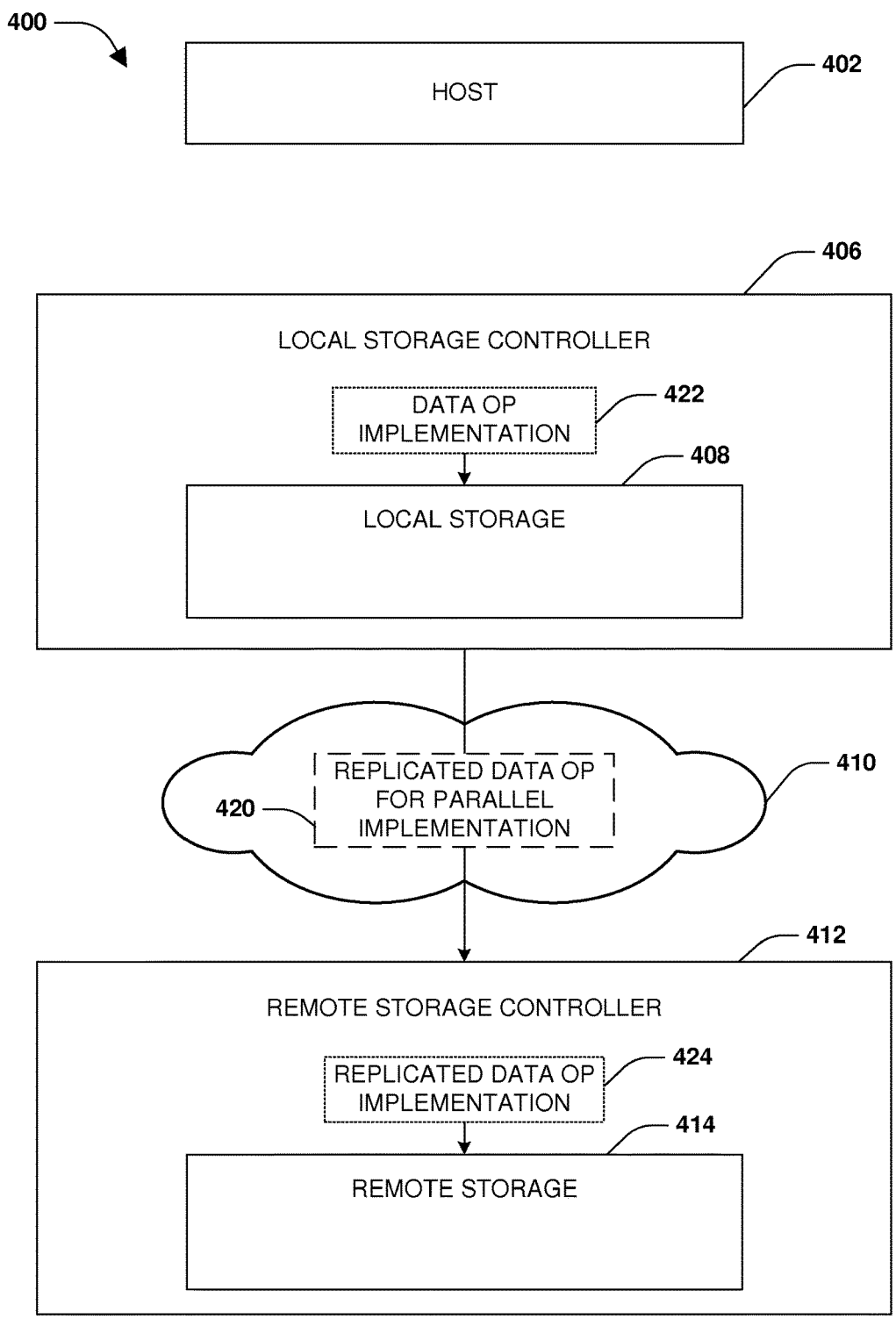
FIG. 4B is a component block diagram illustrating an exemplary computing device for synchronous replication, where a data file operation is locally implemented and a replicated data file operation is remotely implemented in parallel.
Figure 4C:
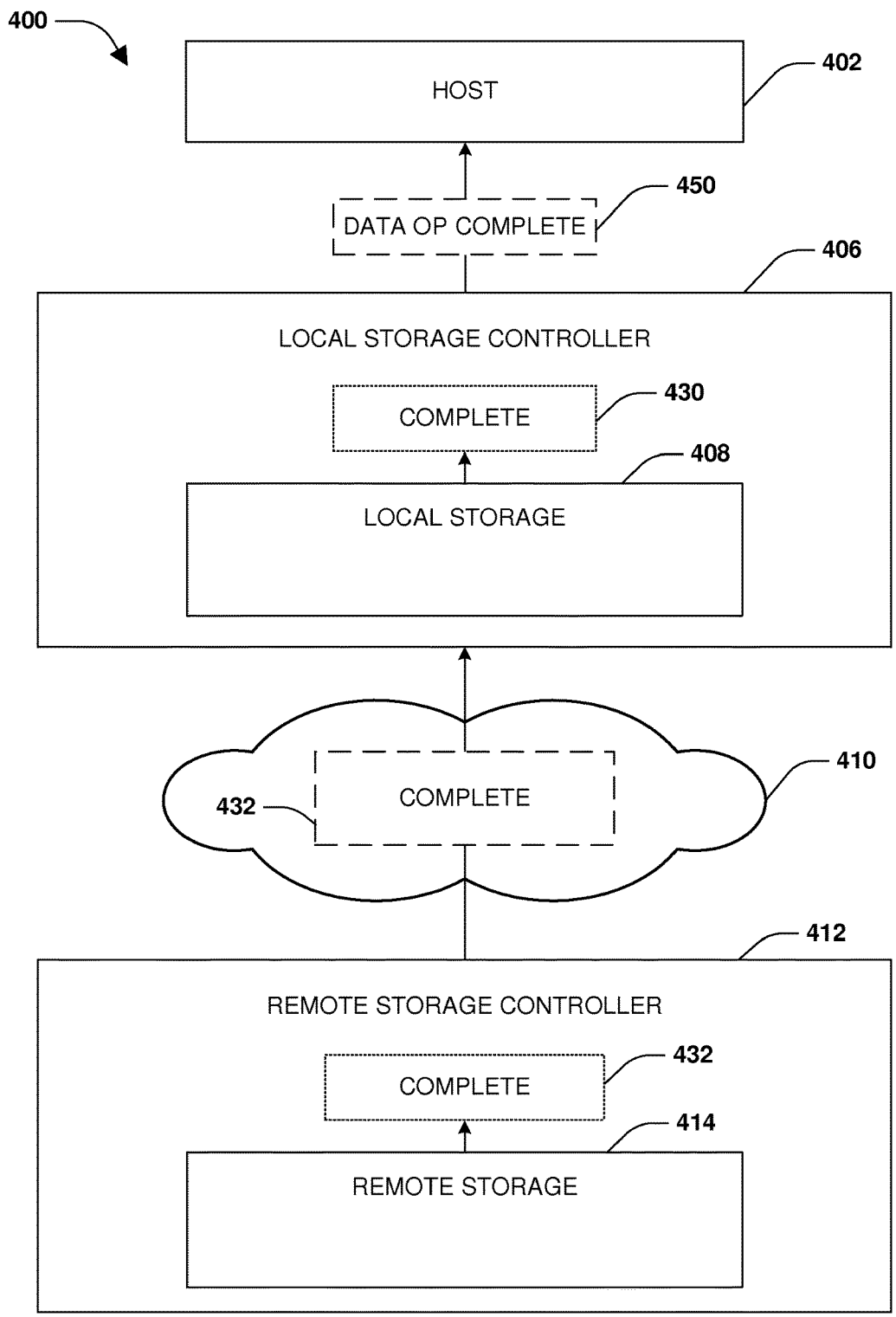
FIG. 4C is a component block diagram illustrating an exemplary computing device for synchronous replication, where a data file operation complete notification is provided to a host.

FIGS. 4A-4C illustrate examples of a network storage environment for which synchronous replication may be implemented by a system 400. A local storage controller 406 (e.g., hosted within a first storage cluster located within a first building, city, or location) may be configured to provide a host 402, such as a client device, with access to data stored within local storage 408, as illustrated in FIG. 4A. The local storage controller 406 may be capable of communicating with a remote storage controller 412 (e.g., hosted within a second storage cluster located within a second building, city, or location) over a network 410.

The local storage controller 406 and the remote storage controller 412 may be configured as disaster recovery partners, such that a surviving storage controller may perform, in response to identifying a failure of the other storage controller, a switchover operation (e.g., to obtain ownership of storage devices owned by the failed storage controller) to provide clients with failover access to replicated data in place of the failed storage controller. In this way, client data access disruption may be reduced.

A synchronous replication relationship may be established between the local storage controller 406 and the remote storage controller 412, such as between the local storage 408 and the remote storage 414. The synchronous replication relationship may specify that data file operations and/or metadata file operations for the local storage 408 are to be implemented at both the local storage 408 and replicated to the remote storage 414, such as before a complete message is provided back to the host 402. The synchronous replication relationship may be specified at a relatively fine level of granularity, such as on a per file or LUN basis.

In an example, a data file operation 404 may be received by the local storage controller 406, as illustrated in FIG. 4A. FIG. 4B illustrates the data file operation 404 being implemented in parallel by the local storage controller 406 and the remote storage controller 412. For example, the data file operation 404 may be locally implemented 422 by the local storage controller 406. The data file operation 404 may be replicated 420 to the remote storage controller 412 as a replicated data file operation that is remotely implemented 424 by the remote storage controller 412. In an example, the local implementation 422 of the data file operation 404 and the remote implementation 424 of the replicated data file operation may be performed in parallel (e.g., the replicated data file operation may be sent to the remote storage controller 412 for remote implementation 424 regardless of whether the local implementation 422 is complete or not). Once the local implementation 422 completes 430 and the remote implementation completes 432, a data file operation complete notification 450 may be sent to the host 402, as illustrated in FIG. 4C.

Figure 5A:
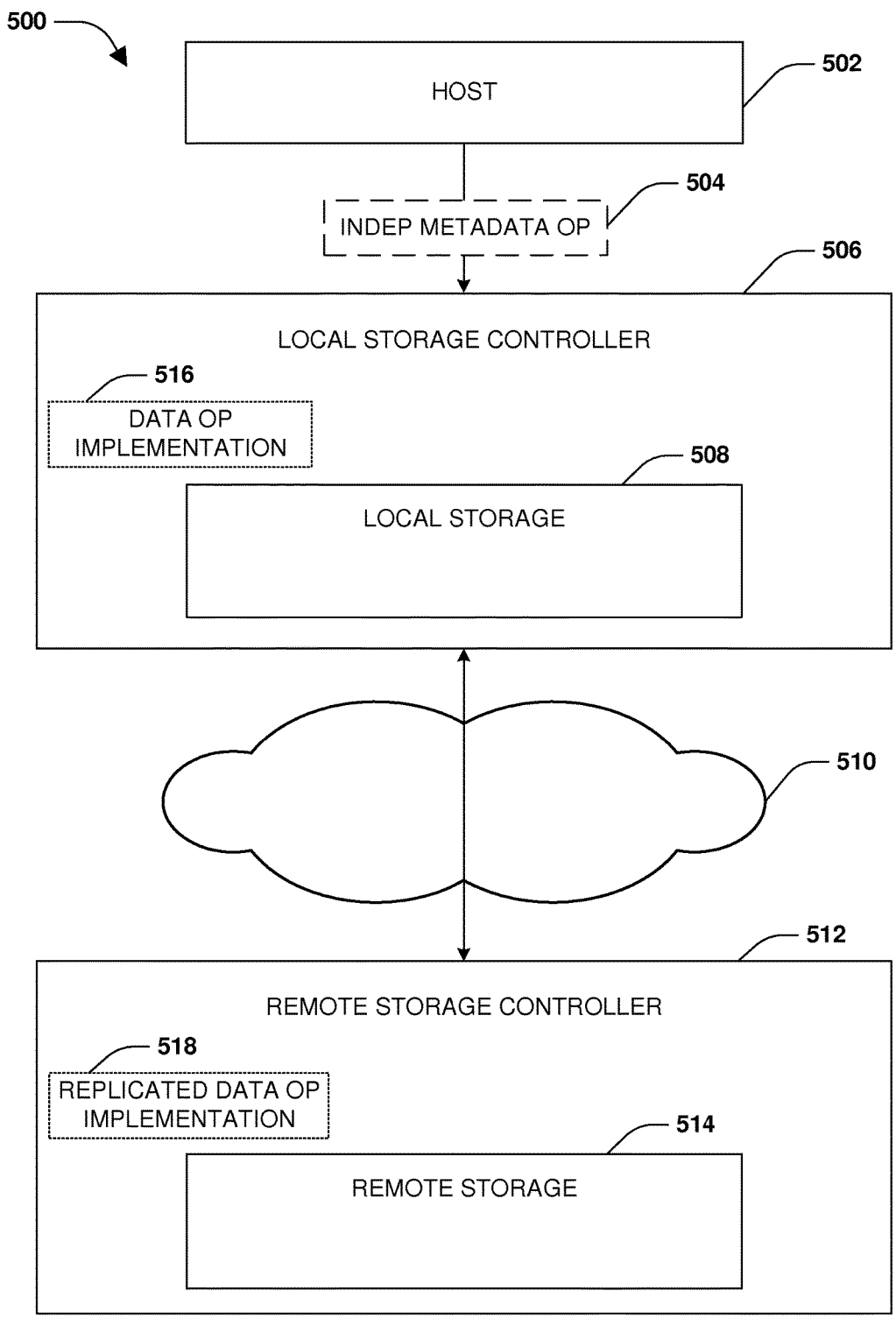
FIG. 5A is a component block diagram illustrating an exemplary computing device for synchronous replication, where an independent metadata file operation is received.

FIGS. 5A-5F illustrate examples of a network storage environment for which synchronous replication may be implemented by a system 500. A local storage controller 506 (e.g., hosted within a first storage cluster located within a first location) may be configured to provide a host 502 with access to data stored within local storage 508, as illustrated in FIG. 5A. The local storage controller 506 may be capable of communicating with a remote storage controller 512 (e.g., hosted within a second storage cluster located within a second location) over a network 510.

The local storage controller 506 and the remote storage controller 512 may be configured as disaster recovery partners, such that a surviving storage controller may perform, in response to identifying a failure of the other storage controller, a switchover operation (e.g., to obtain ownership of storage devices owned by the failed storage controller) to provide clients with failover access to replicated data in place of the failed storage controller. In this way, client data access disruption may be reduced.

A synchronous replication relationship may be established between the local storage controller 506 and the remote storage controller 512, such as between the local storage 508 and the remote storage 514. The synchronous replication relationship may specify that data file operations and/or metadata file operations for the local storage 508 are to be implemented at both the local storage 508 and replicated to the remote storage 514, such as before a complete message is provided back to the host 502. The synchronous replication relationship may be specified at a relatively fine level of granularity, such as on a per file or LUN basis.

Figure 5B:
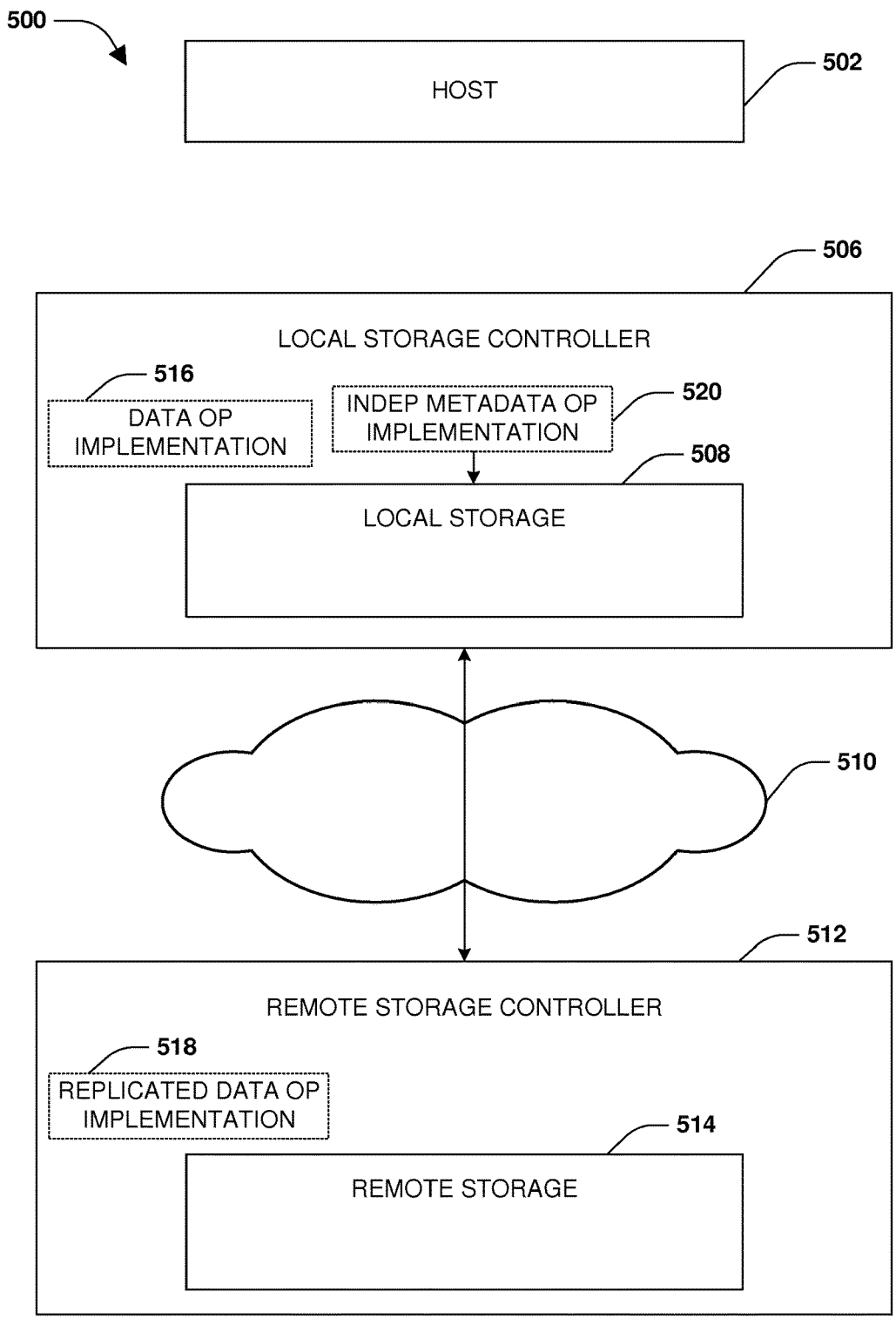
FIG. 5B is a component block diagram illustrating an exemplary computing device for synchronous replication, where an independent metadata file operation is locally implemented.

In an example, an independent metadata file operation 504 may be received by the local storage controller 506, as illustrated in FIG. 5A. The independent metadata file operation 504 may be independent of in-flight data file operations (e.g., data file operations not yet responded back to the host 502 as complete), and thus may be implemented in parallel with local implementation 516 of in-flight data file operations by the local storage controller 506 and/or remote implementation 518 of replicated data file operations by the remote storage controller 512. In an example, the independent metadata file operation 504 may correspond to a change in ownership of a storage container, a change in access permission, and/or other changes to file system metadata that are not interdependent with in-flight data file operations. FIG. 5B illustrates the independent metadata file operation 504 being locally implemented 520 upon the local storage 508 in parallel with the local implementation 516 of in-flight data file operations.

Figure 5C:
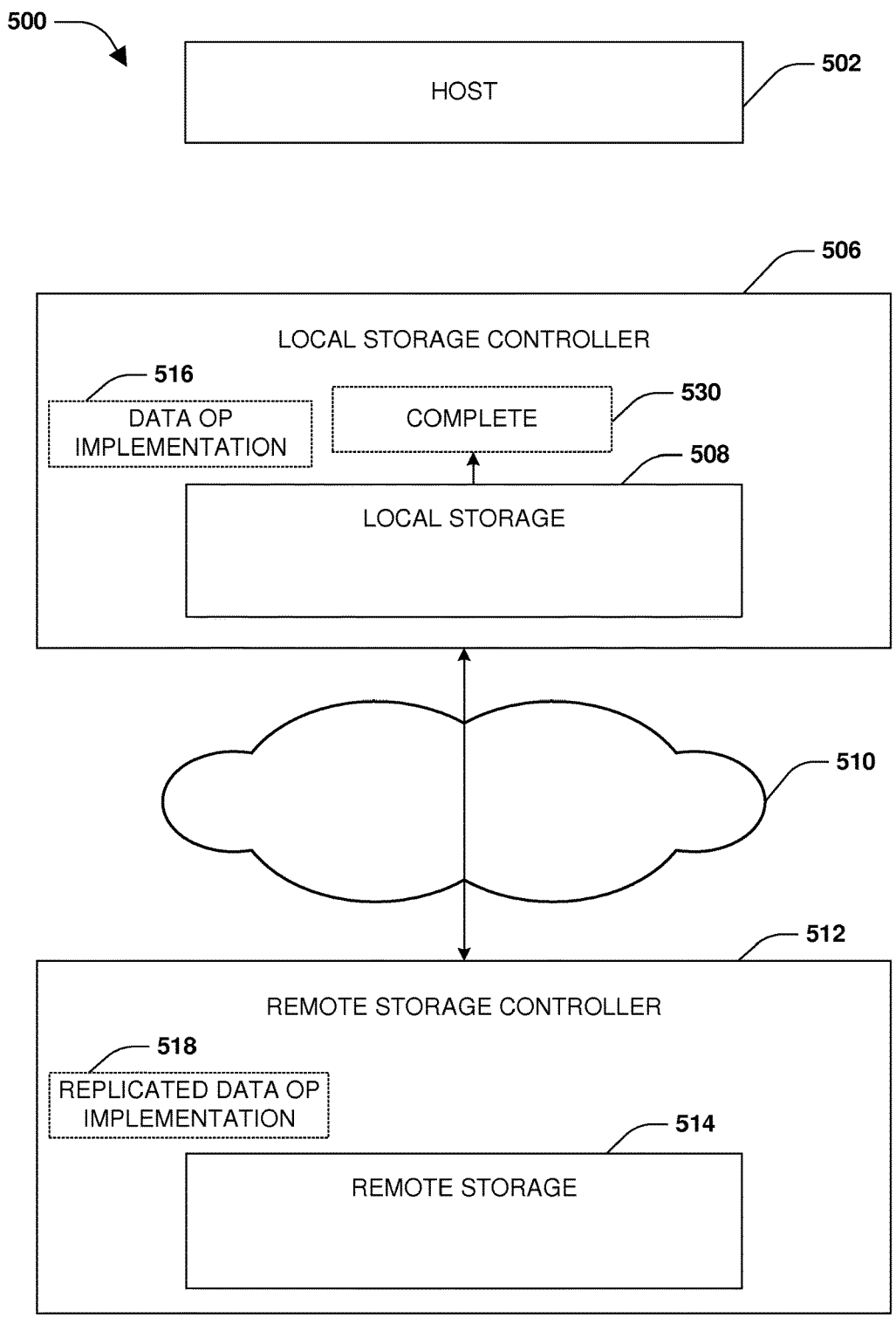
FIG. 5C is a component block diagram illustrating an exemplary computing device for synchronous replication, where local implementation of an independent metadata file operation is completed.
Figure 5D:
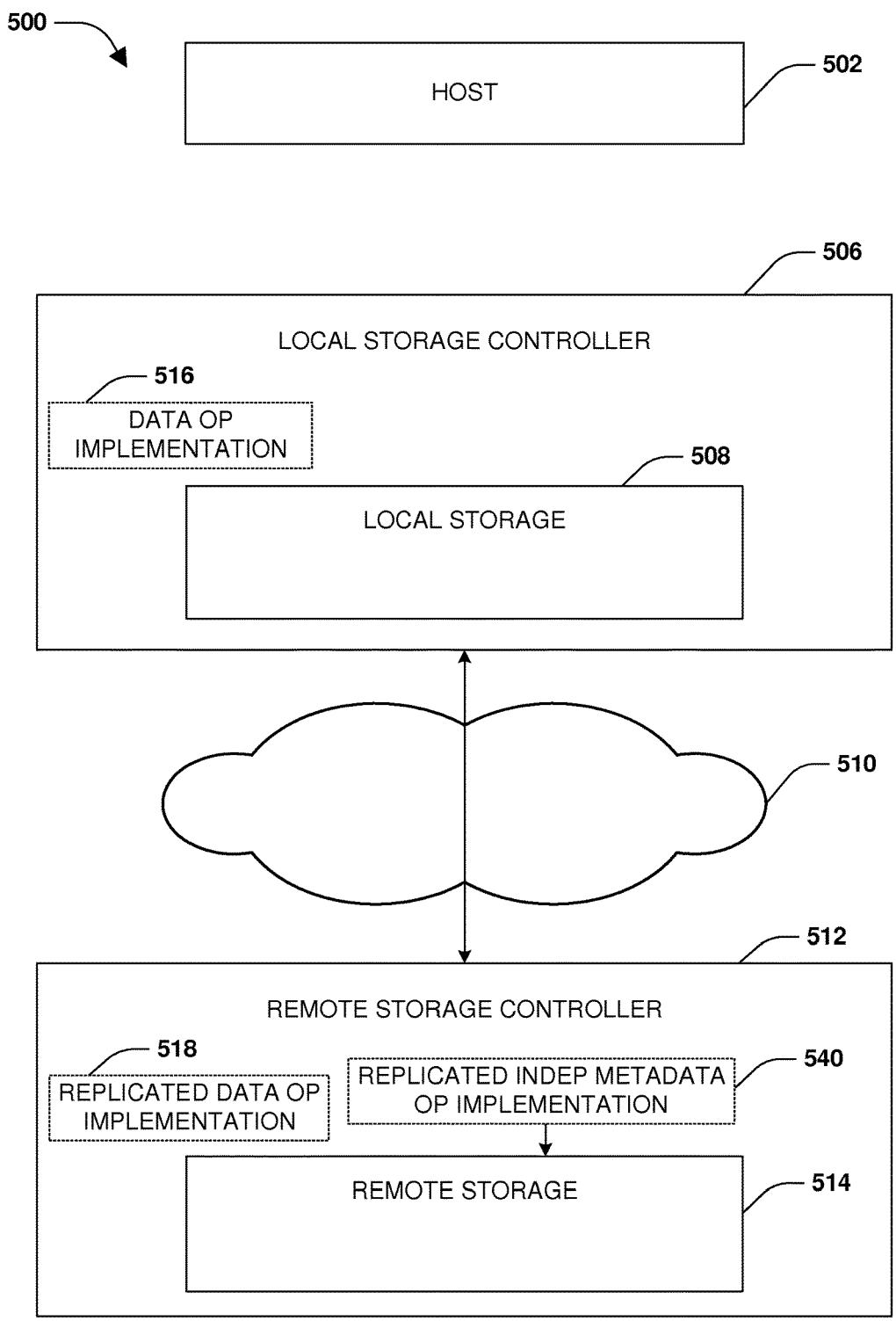
FIG. 5D is a component block diagram illustrating an exemplary computing device for synchronous replication, where a replicated independent metadata file operation is remote implemented.
Figure 5E:
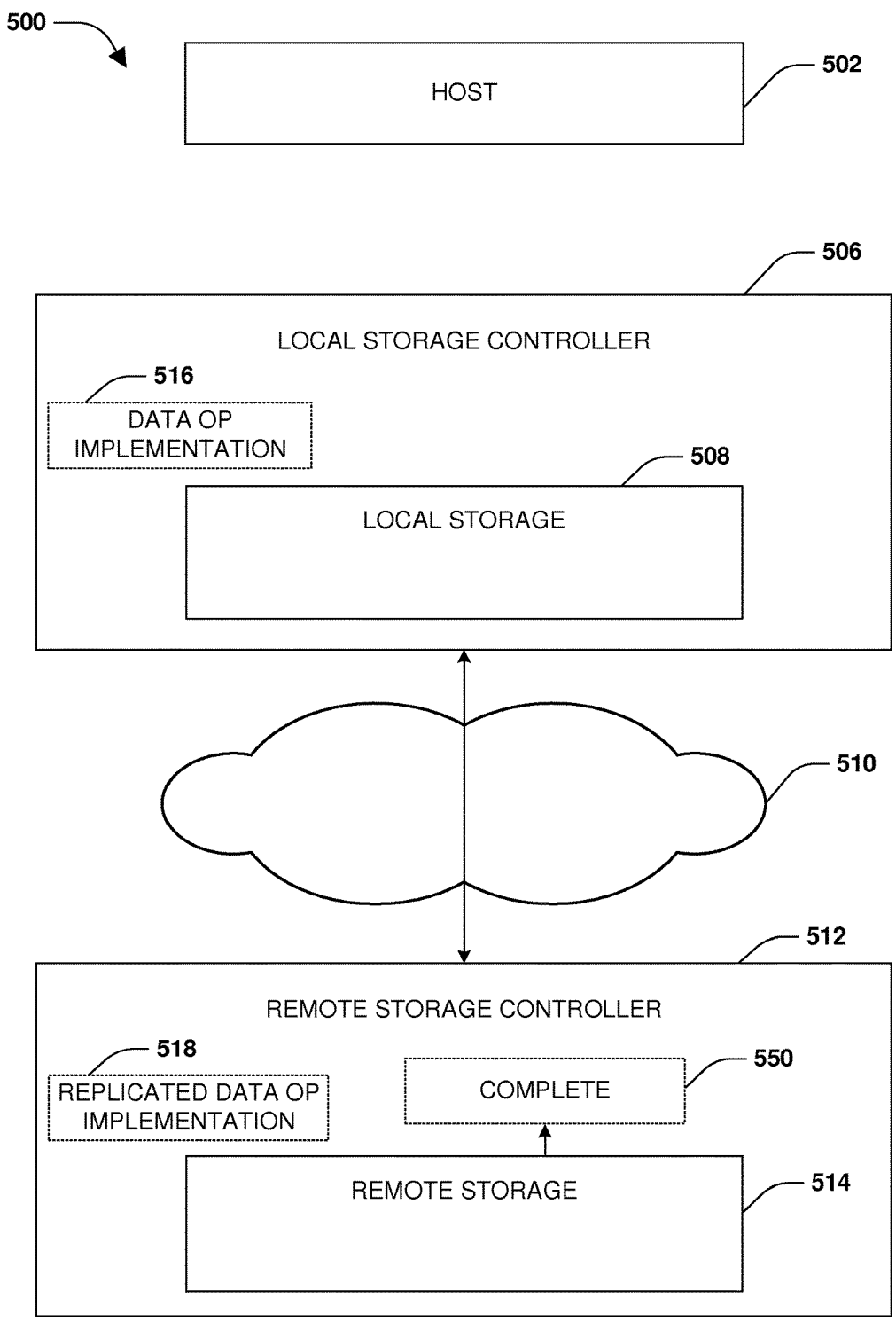
FIG. 5E is a component block diagram illustrating an exemplary computing device for synchronous replication, where remote implementation of a replicated independent metadata file operation is completed.
Figure 5F:
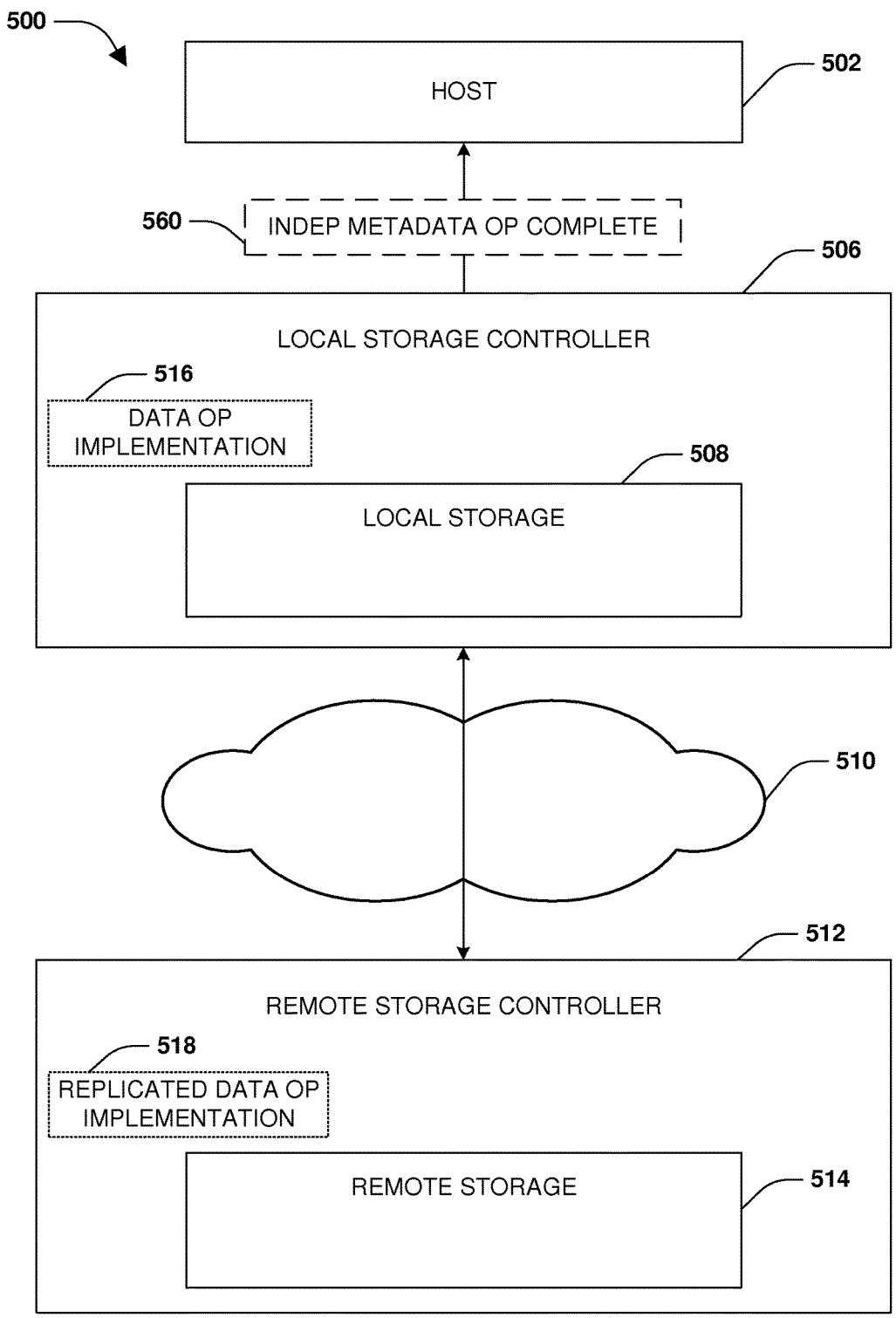
FIG. 5F is a component block diagram illustrating an exemplary computing device for synchronous replication, where an independent metadata file operation complete notification is provided to a host.

FIG. 5C illustrates the local storage controller 506 generating a completion notification 530 for the local implementation 520 of the independent metadata file operation 504 upon the local storage 508. Accordingly, a replicated independent metadata file operation (e.g., the independent metadata file operation 504 may have been split by a splitter into the replicated independent metadata file operation) may be sent to the remote storage controller 512 for remote implementation 540 based upon the completion notification 530, as illustrated in FIG. 5D. FIG. 5E illustrates the remote storage controller 512 generating a second completion notification 550 for the remote implementation 540 of the replicated independent metadata file operation upon the remote storage 514. In this way, file system metadata of the remote storage 514 may mirror file system metadata of the local storage 508 based upon the local implementation 520 of the independent metadata file operation 504 upon the local storage 508 and the remote implementation 540 of the replicated independent metadata file operation upon the remote storage 514. Once the independent metadata file operation 504 and the replicated independent metadata file operation complete, an independent metadata file operation complete notification 560 may be sent to the host 502, as illustrated in FIG. 5F.

Figure 6A:
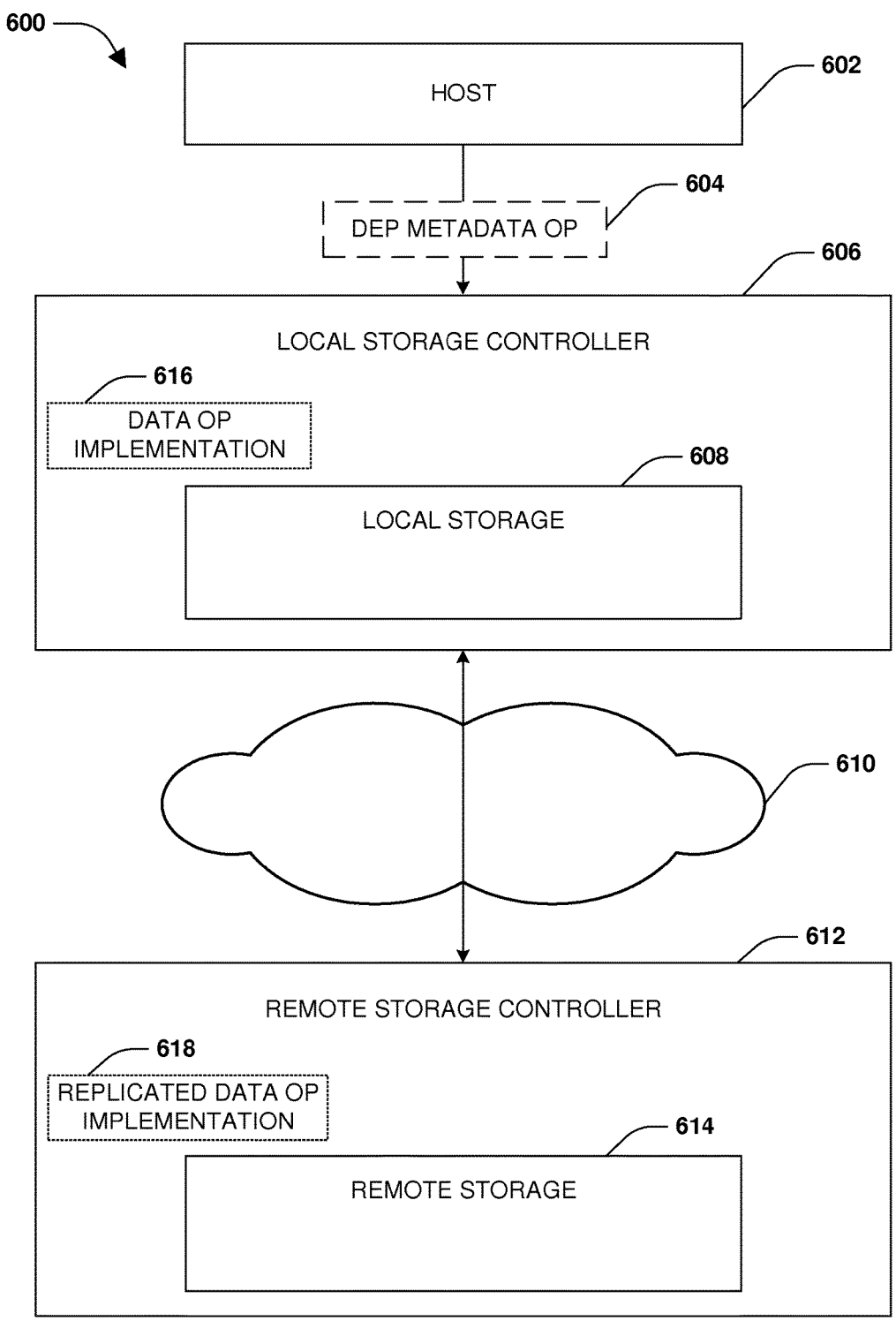
FIG. 6A is a component block diagram illustrating an exemplary computing device for synchronous replication, where a dependent metadata file operation is received.

FIGS. 6A-6G illustrate examples of a network storage environment for which synchronous replication may be implemented by a system 600. A local storage controller 606 (e.g., hosted within a first storage cluster located within a first location) may be configured to provide a host 602 with access to data stored within local storage 608, as illustrated in FIG. 6A. The local storage controller 606 may be capable of communicating with a remote storage controller 612 (e.g., hosted within a second storage cluster located within a second location) over a network 610.

The local storage controller 606 and the remote storage controller 612 may be configured as disaster recovery partners, such that a surviving storage controller may perform, in response to identifying a failure of the other storage controller, a switchover operation (e.g., to obtain ownership of storage devices owned by the failed storage controller) to provide clients with failover access to replicated data in place of the failed storage controller. In this way, client data access disruption may be reduced.

A synchronous replication relationship may be established between the local storage controller 606 and the remote storage controller 612, such as between the local storage 608 and the remote storage 614. The synchronous replication relationship may specify that data file operations and/or metadata file operations for the local storage 608 are to be implemented at both the local storage 608 and replicated to the remote storage 614, such as before a complete message is provided back to the host 602. The synchronous replication relationship may be specified at a relatively fine level of granularity, such as on a per file or LUN basis.

In an example, a dependent metadata file operation 604 may be received by the local storage controller 606, as illustrated in FIG. 6A. The dependent metadata file operation 604 may be dependent upon in-flight data file operations (e.g., data file operations not yet responded back to the host 602 as complete), and thus may not be parallel implemented with in-flight data file operations because indeterministic results may arise (e.g., inconsistencies between data and/or metadata may arise between the local storage 608 and the remote storage 614). For example, a discrepancy over a file size of a file may arise based upon what order an in-flight data file operation to write to the file and a dependent metadata file operation to shrink a size of the file are performed (e.g., the dependent metadata file operation may be overridden by the in-flight data file operation where the in-flight data file operation is directed to an offset between an original size and a new size of the file). Accordingly, in-flight data file operations are drained before the dependent metadata file operation is performed.

Figure 6B:
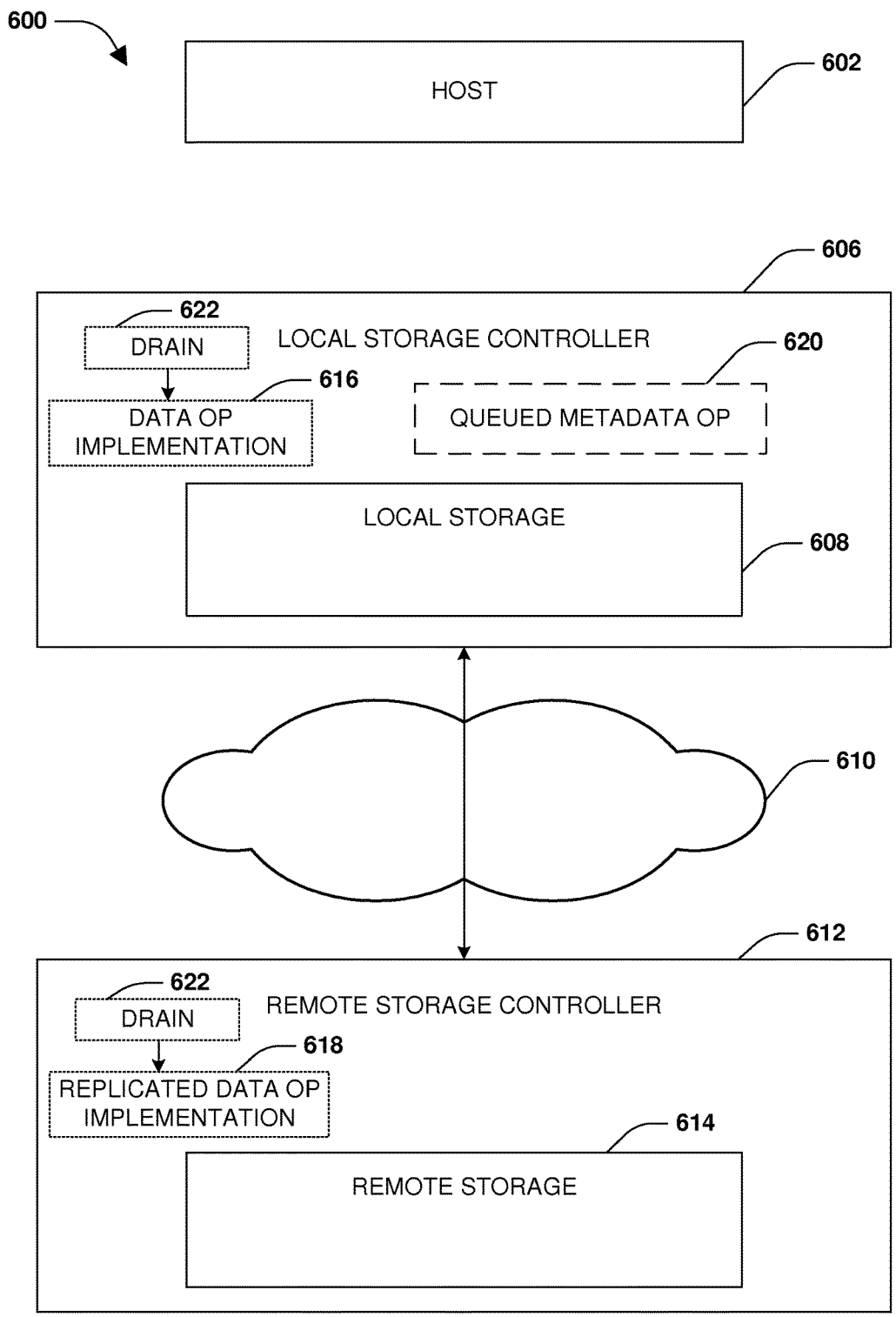
FIG. 6B is a component block diagram illustrating an exemplary computing device for synchronous replication, where a dependent metadata file operation is queued and in-flight data operations are drained.
Figure 6C:
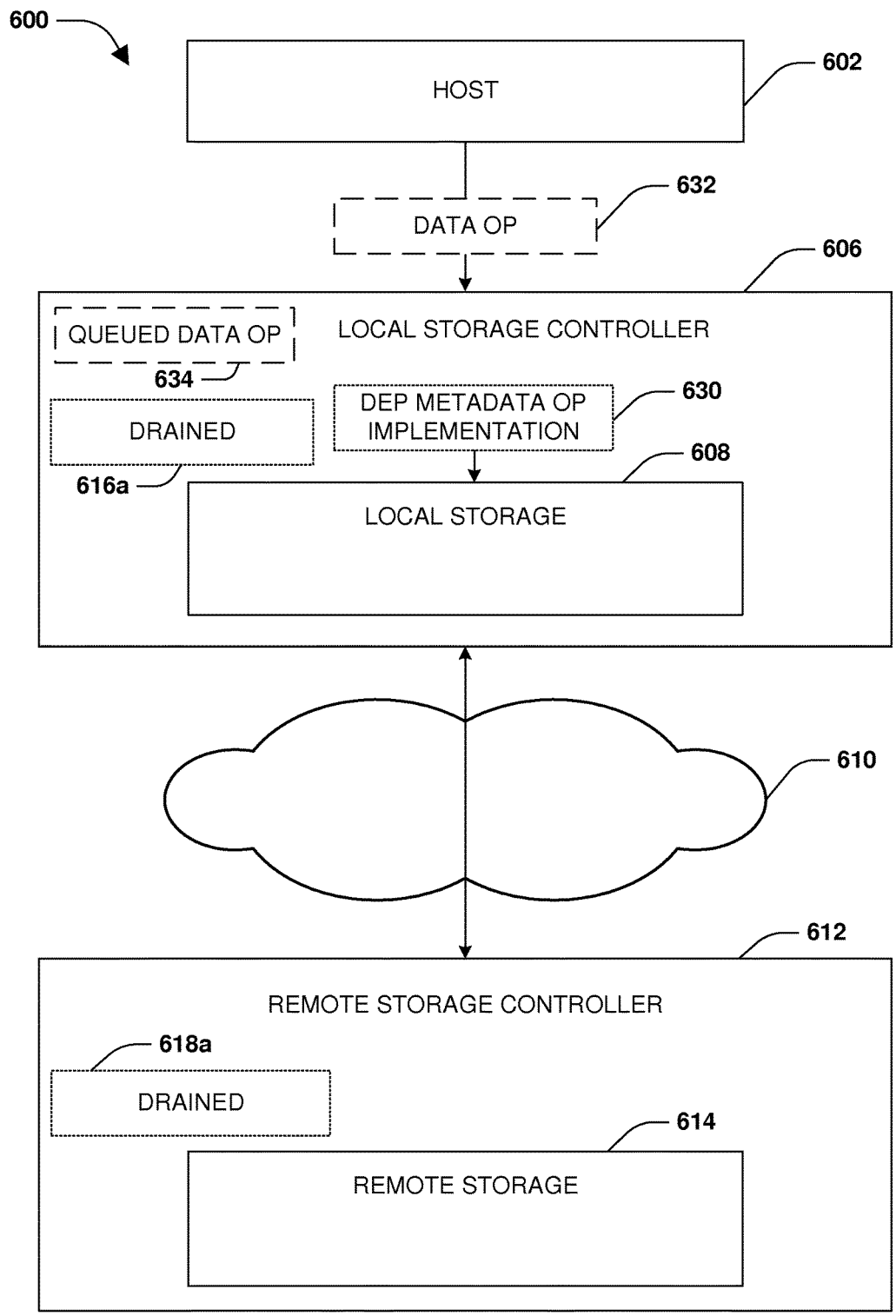
FIG. 6C is a component block diagram illustrating an exemplary computing device for synchronous replication, where local implementation of a dependent metadata file operation is performed.

FIG. 6B illustrates the dependent metadata file operation 604 being queued into a queue 620. In-flight data file operations being locally implemented 616 by the local storage controller 606 and/or replicated in-flight data file operations being remotely implemented 618 by the remote storage controller 612 may be drained 622 (e.g., completed). Once the in-flight data file operations are completely drained 616a and the replicated data file operations are completely drained 618a, the queued dependent metadata file operation 604 may be dequeued from the queue 620 and locally implemented 630 upon the local storage 608 by the local storage controller 606, as illustrated in FIG. 6C. New incoming data file operations 632 may be queued 634 while the dependent metadata file operation 604 is being locally implemented 630.

Figure 6D:
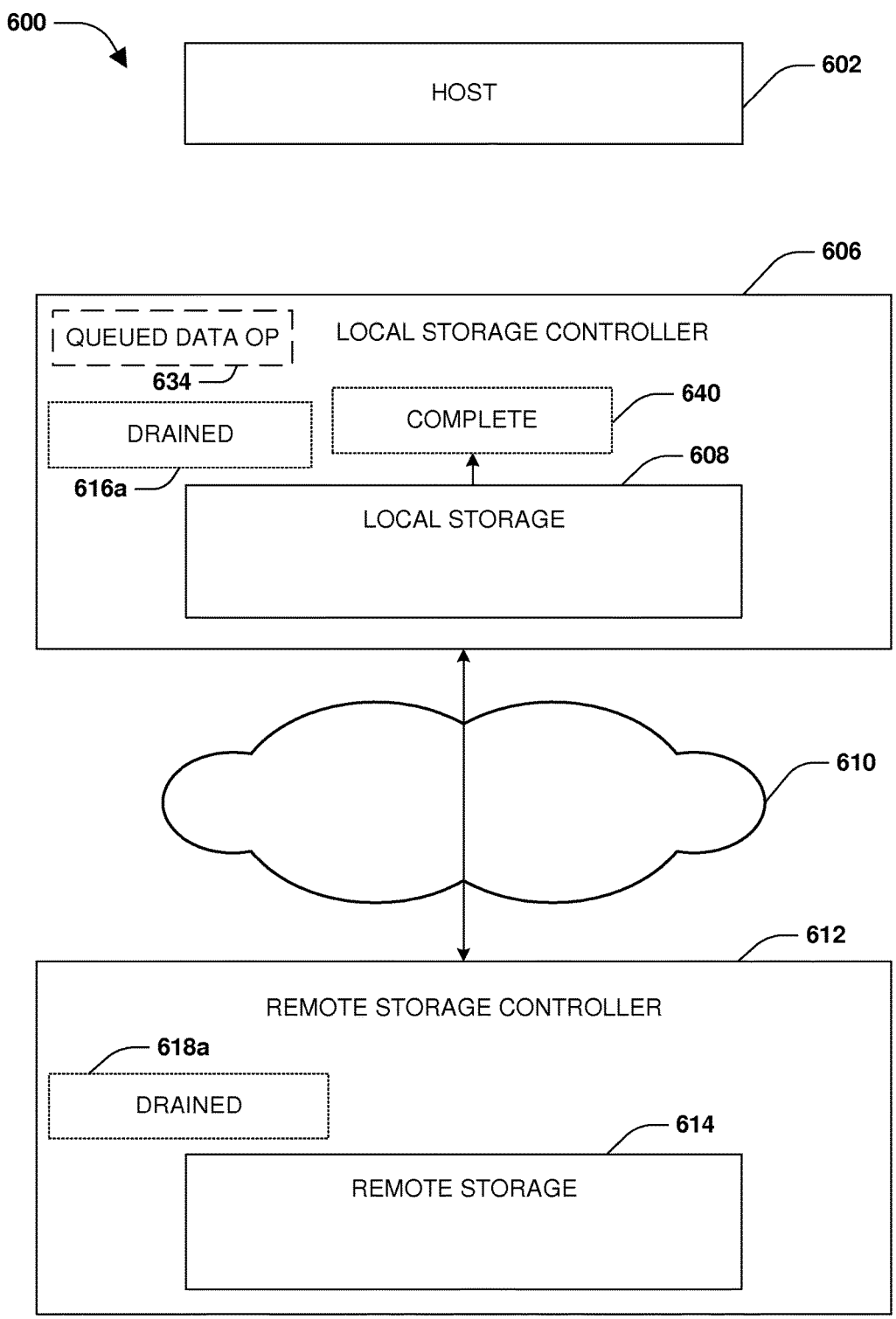
FIG. 6D is a component block diagram illustrating an exemplary computing device for synchronous replication, where local implementation of a dependent metadata file operation is completed.
Figure 6E:
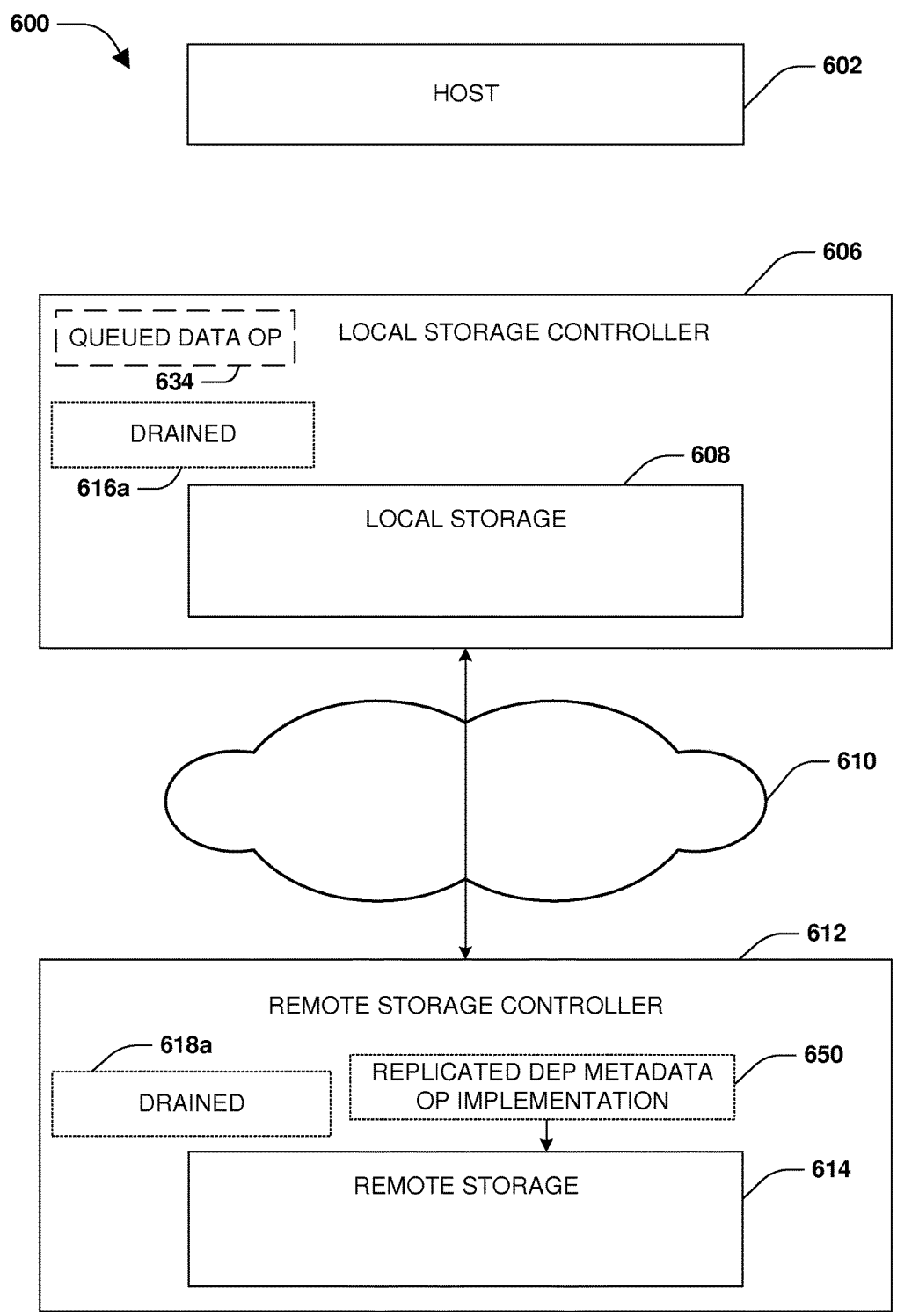
FIG. 6E is a component block diagram illustrating an exemplary computing device for synchronous replication, where a replicated dependent metadata file operation is remotely implemented.
Figure 6F:
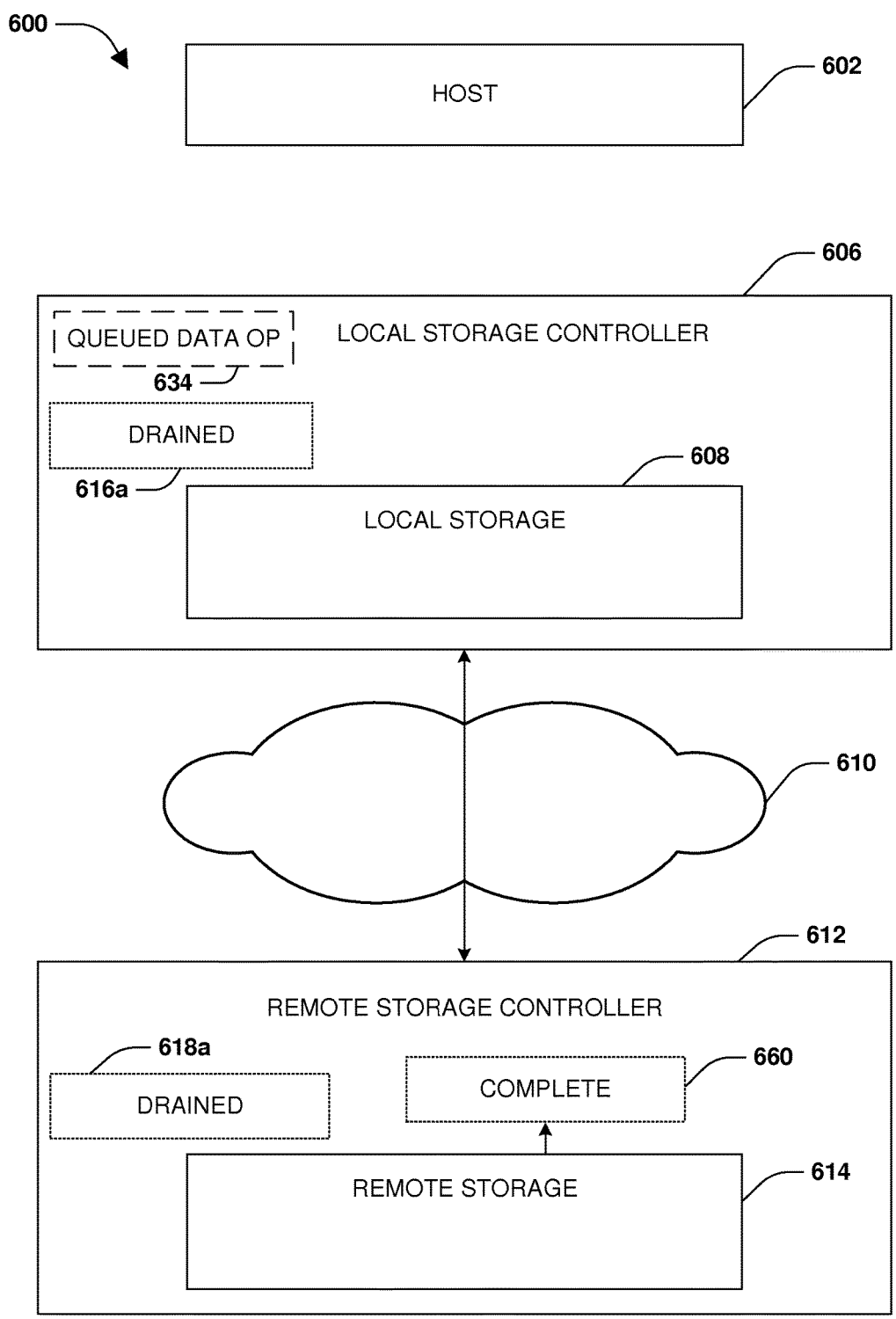
FIG. 6F is a component block diagram illustrating an exemplary computing device for synchronous replication, where remote implementation of a replicated dependent metadata file operation is completed.

FIG. 6D illustrates the local storage controller 606 generating a completion notification 640 for the local implementation 630 of the dependent metadata file operation 604 upon the local storage 608. Accordingly, a replicated dependent metadata file operation (e.g., the dependent metadata file operation 604 may have been split by a splitter into the replicated dependent metadata file operation) may be sent to the remote storage controller 612 for remote implementation 650 based upon the completion notification 640, as illustrated in FIG. 6E. FIG. 6F illustrate the remote storage controller 612 generating a completion notification 660 for the remote implementation 650 of the replicated dependent metadata file operation upon the remote storage 614. In this way, file system metadata of the remote storage 614 may mirror file system metadata of the local storage 608 based upon the local implementation 630 of the dependent metadata file operation 604 upon the local storage 608 and the remote implementation 650 of the replicated dependent metadata file operation upon the remote storage 614.

Figure 6G:
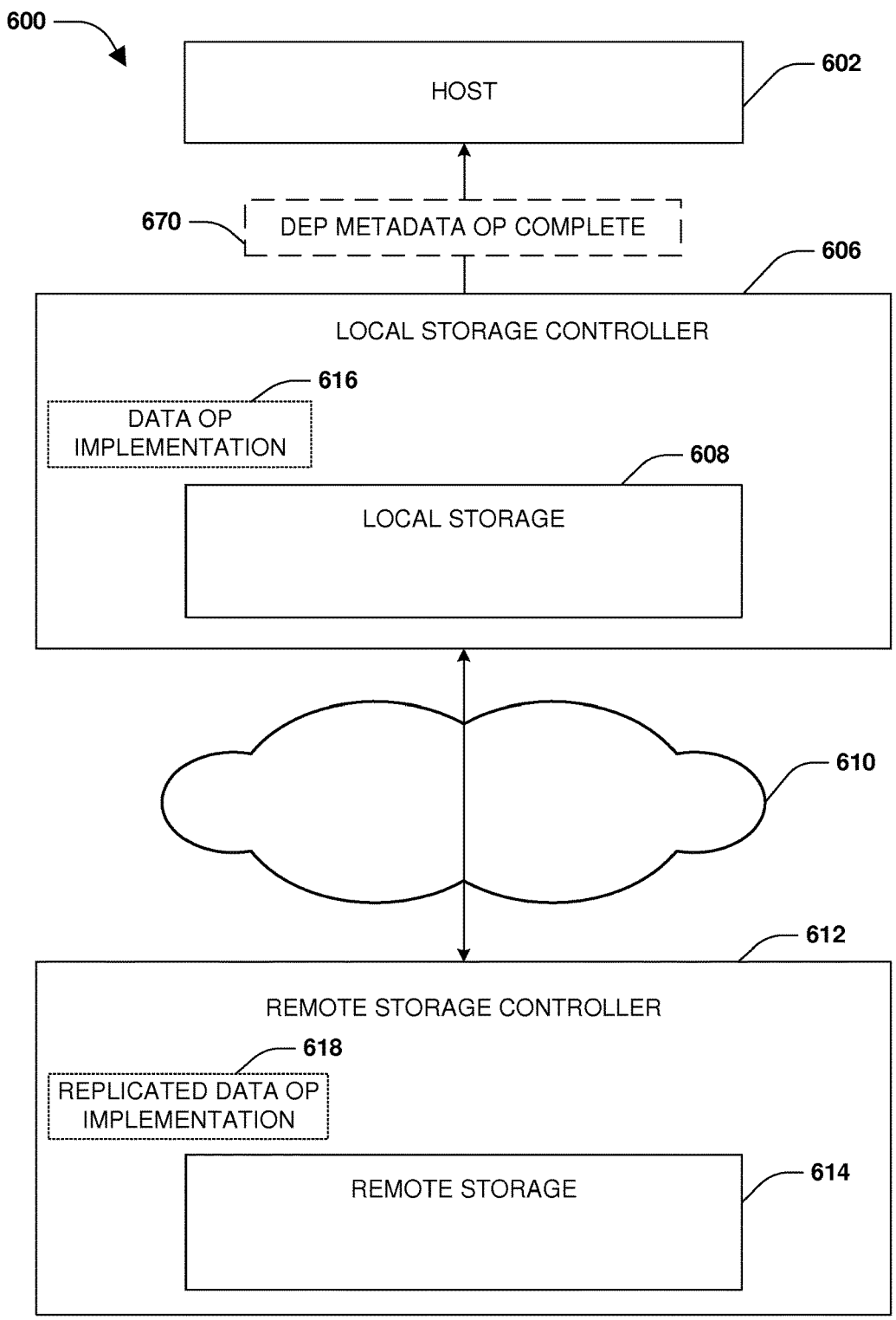
FIG. 6G is a component block diagram illustrating an exemplary computing device for synchronous replication, where a dependent metadata file operation complete notification is provided to a host.

Once the dependent metadata file operation 604 and the replicated dependent metadata file operation complete, a dependent metadata file operation complete notification 670 may be sent to the host 602, as illustrated in FIG. 6G. Upon completion of queued dependent metadata file operations, local in-flight data file operation implement 616 and/or remote in-flight data file operation implementation 618 may be resumed.

Figure 7:
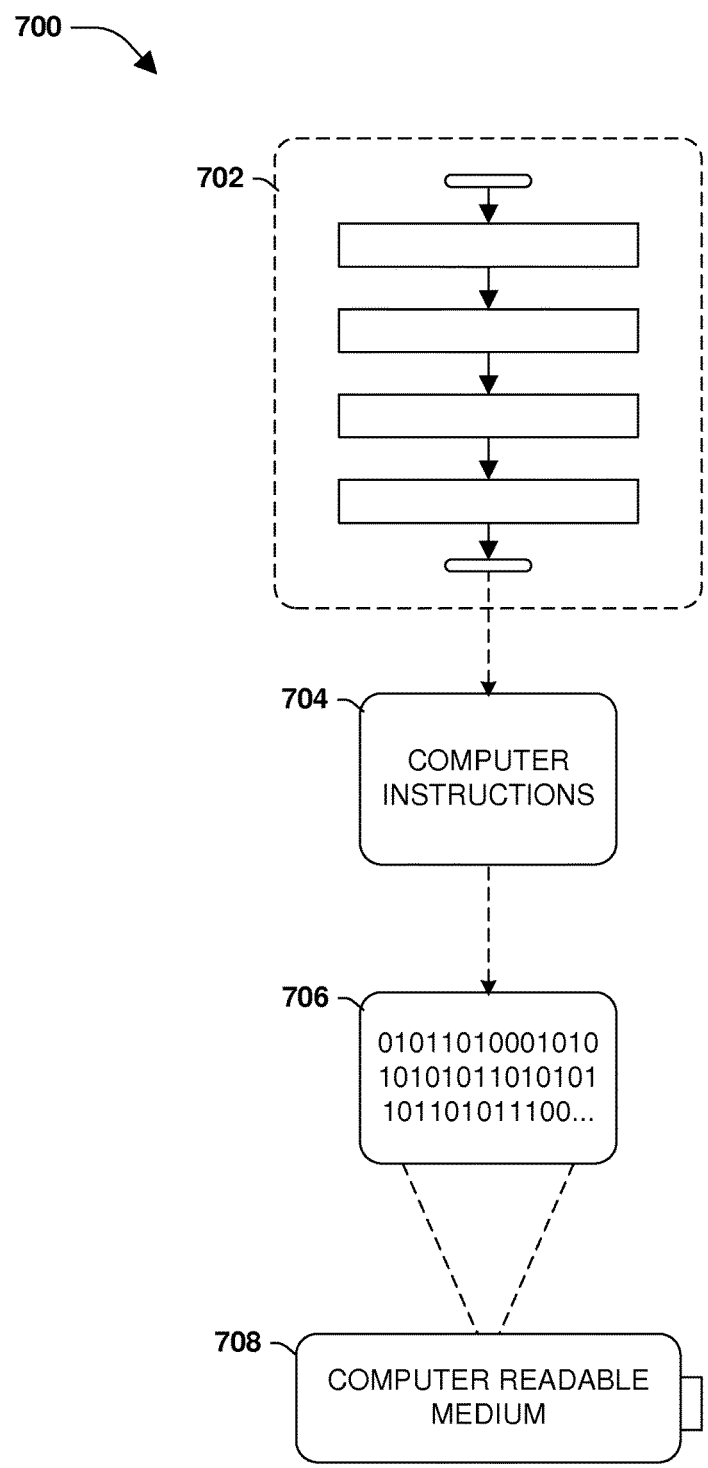
FIG. 7 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 7, wherein the implementation 700 comprises a computer-readable medium 708, such as a CD-R DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 300 of FIG. 3, for example. In some embodiments, the processor-executable instructions 704 are configured to implement a system, such as at least some of the exemplary system 400 of FIGS. 4A-4C, at least some of the exemplary system 500 of FIGS. 5A-5F, and/or at least some of the exemplary system 600 of FIGS. 6A-6G, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
receiving file operations targeting first storage, wherein file operations that target objects different than objects targeted by pending file operations are identified as independent metadata operations, file operations that target the same objects as the pending file operations are identified as dependent metadata operations that depend upon prior execution of the pending file operations, and file operations that write data are identified as data operations;
replicating the file operations to create replicated data operations, replicated independent metadata operations, and replicated dependent metadata operations to execute upon second storage;
executing the data operations upon the first storage and the replicated data operations upon the second storage in parallel; and
serially executing the independent and dependent metadata operations upon the first storage before executing corresponding replicated independent and replicated dependent metadata operations upon the second storage, wherein the dependent and the replicated dependent metadata operations are executed upon completion of the pending file operations.

2. The method of claim 1, wherein the serially executing comprises:
executing the independent metadata operations in parallel with execution of the data operations.

3. The method of claim 1, comprising:
storing the dependent metadata operations into a queue based upon the dependent metadata operations being dependent upon prior execution of the pending file operations.

4. The method of claim 3, comprising:
draining the pending file operations by completing execution of the pending file operations while the dependent metadata operations are within the queue.

5. The method of claim 4, comprising:
de-queuing and executing the dependent metadata operations based upon execution of the pending file operations completing.

6. The method of claim 3, comprising:
storing incoming data operations during execution of the dependent metadata operations and the replicated dependent metadata operations into the queue.

7. The method of claim 1, comprising:
tunneling a file operation into a single replication interface for execution based upon the file operation corresponding to a single unified internet file access protocol.

8. The method of claim 1, comprising:
intercepting the file operations before the file operations are delivered to a file system.

9. The method of claim 1, wherein the file operations correspond to a file access protocol.

10. The method of claim 1, wherein the receiving file operations comprises:
evaluating a configuration cache to determine whether a storage object within the first storage targeted by a file operation is designated for synchronous replication.

11. The method of claim 1, comprising:
transmitting a file operation complete notification to a host based upon receiving a completion notification that execution of a corresponding independent metadata operation successfully completed and receiving a remote completion notification that execution of a corresponding replicated independent metadata operation completed.

12. The method of claim 1, comprising:
transmitting a file operation complete notification to a host based upon receiving a completion notification that execution of a corresponding dependent metadata operation successfully complete and receiving a remote completion notification that execution of a corresponding replicated dependent metadata operation completed.

13. A non-transitory machine readable medium comprising instructions for performing a method, which when executed by a machine, causes the machine to:
receive file operations targeting first storage, wherein file operations that target objects different than objects targeted by pending file operations are identified as independent metadata operations, file operations that target the same objects as the pending file operations are identified as dependent metadata operations that depend upon prior execution of the pending file operations, and file operations that write data are identified as data operations;
replicate the file operations to create replicated data operations, replicated independent metadata operations, and replicated dependent metadata operations to execute upon second storage;
execute the data operations upon the first storage and the replicated data operations upon the second storage in parallel; and
serially executing the independent and dependent metadata operations upon the first storage before executing corresponding replicated independent and replicated dependent metadata operations upon the second storage, wherein the dependent and the replicated dependent metadata operations are executed upon completion of the pending file operations.

14. The non-transitory machine readable medium of claim 13, wherein the instructions cause the machine to:
store the dependent metadata operations into a queue based upon the dependent metadata operations being dependent upon prior execution of the pending file operations.

15. The non-transitory machine readable medium of claim 14, wherein the instructions cause the machine to:
drain the pending file operations by completing execution of the pending file operations while the dependent metadata operations are within the queue.

16. The non-transitory machine readable medium of claim 13, wherein the instructions cause the machine to:
execute the independent metadata operation in parallel with execution of the data operations.

17. A computing device comprising:
a memory comprising machine executable code; and a processor coupled to the memory, the processor configured to execute the machine executable code to cause the processor to:

receive file operations targeting first storage, wherein file operations that target objects different than objects targeted by pending file operations are identified as independent metadata operations, file operations that target the same objects as the pending file operations are identified as dependent metadata operations that depend upon prior execution of the pending file operations, and file operations that write data are identified as data operations;

replicate the file operations to create replicated data operations, replicated independent metadata operations, and replicated dependent metadata operations to execute upon second storage;

execute the data operations upon the first storage and the replicated data operations upon the second storage in parallel; and serially executing the independent and dependent metadata operations upon the first storage before executing corresponding replicated independent and replicated dependent metadata operations upon the second storage, wherein the dependent and the replicated dependent metadata operations are executed upon completion of the pending file operations.

18. The computing device of claim 17, wherein the machine executable code causes the processor to:

store the dependent metadata operations into a queue based upon the dependent metadata operations being dependent upon prior execution of the pending file operations.

19. The computing device of claim 18, wherein the machine executable code causes the processor to:

drain the pending file operations by completing execution of the pending file operations while the dependent metadata operations are within the queue.

20. The computing device of claim 17, wherein the machine executable code causes the processor to:

evaluate a configuration cache to determine whether a storage object within the first storage targeted by a file operation is designated for synchronous replication.

* * * * *